United States Patent Office 3,452,551
Patented July 1, 1969

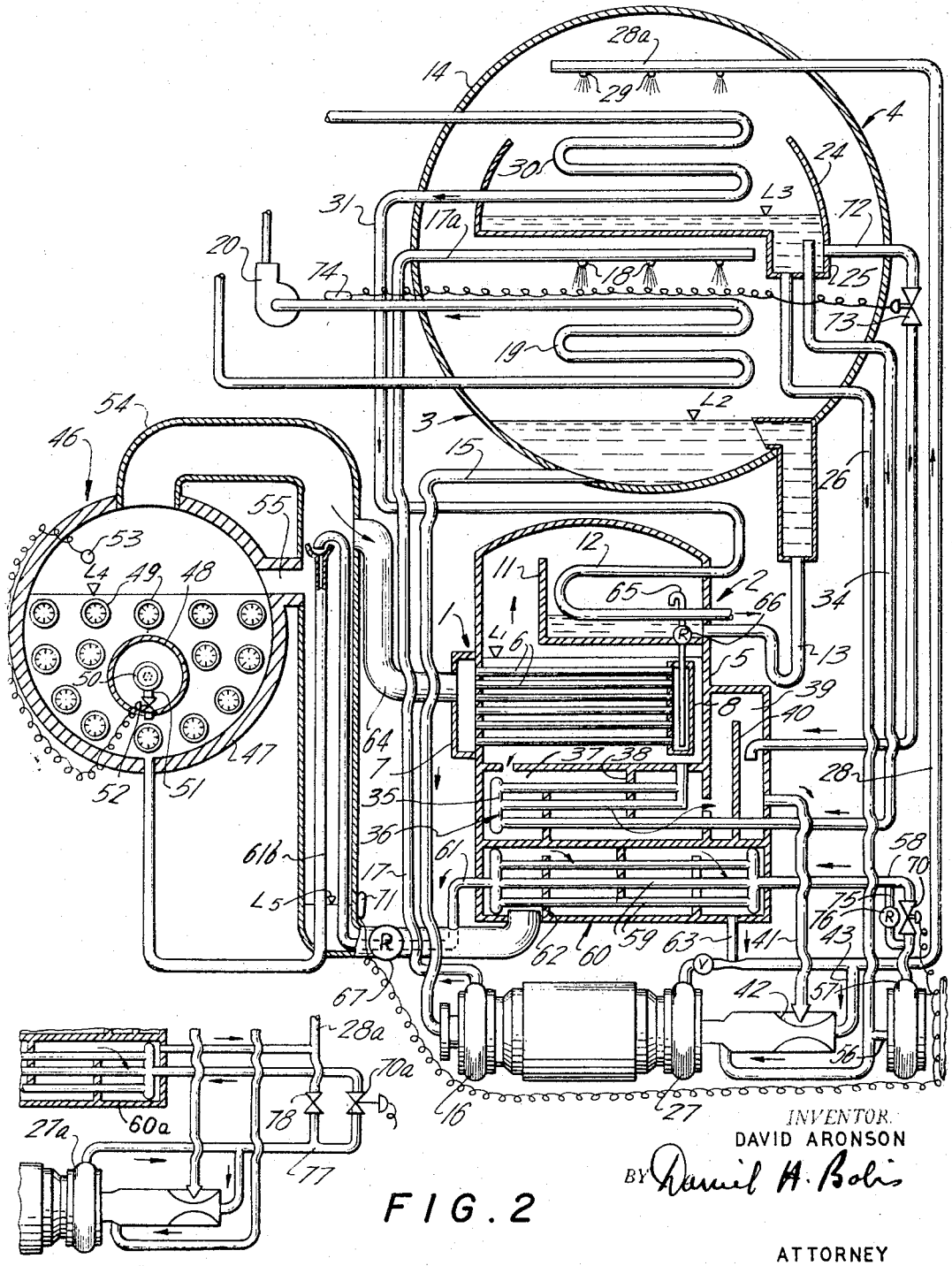

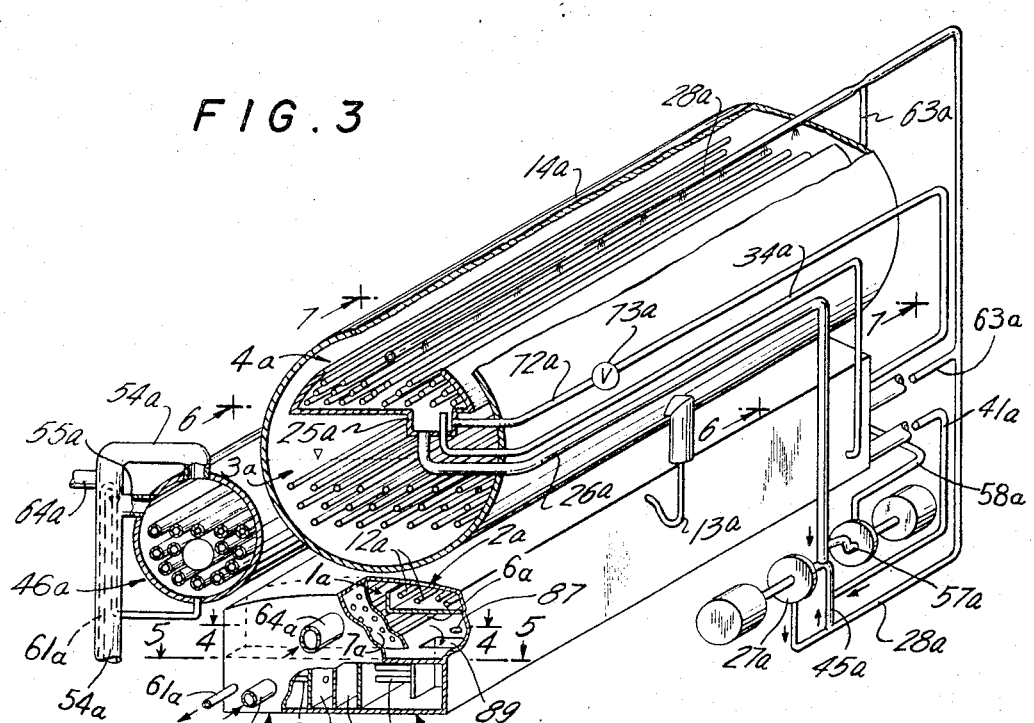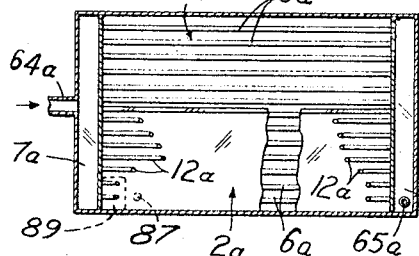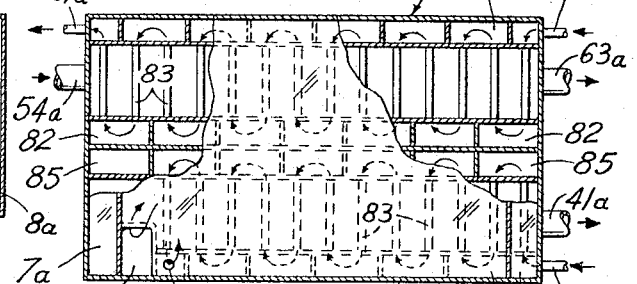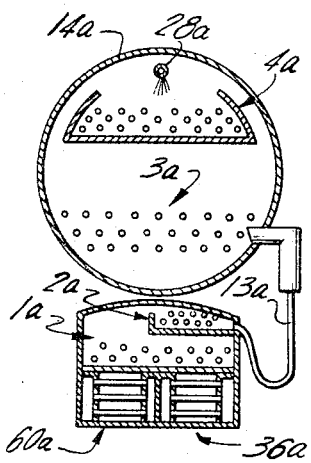

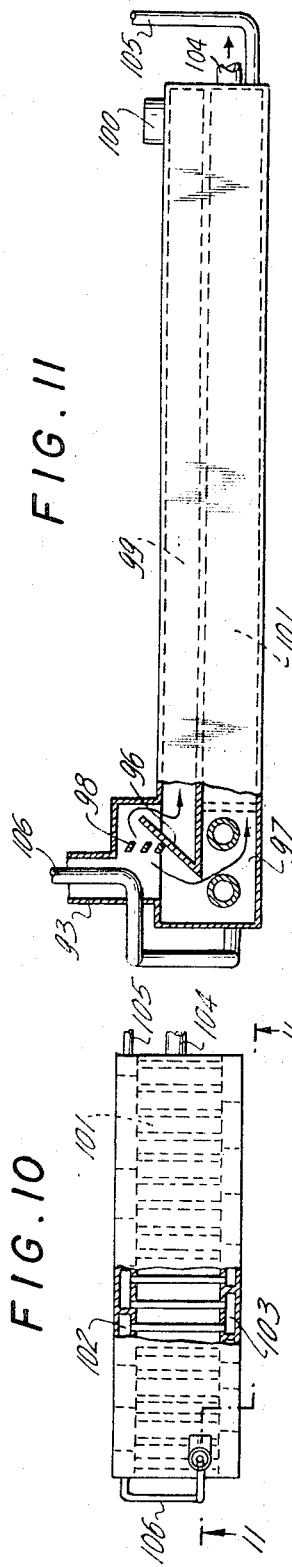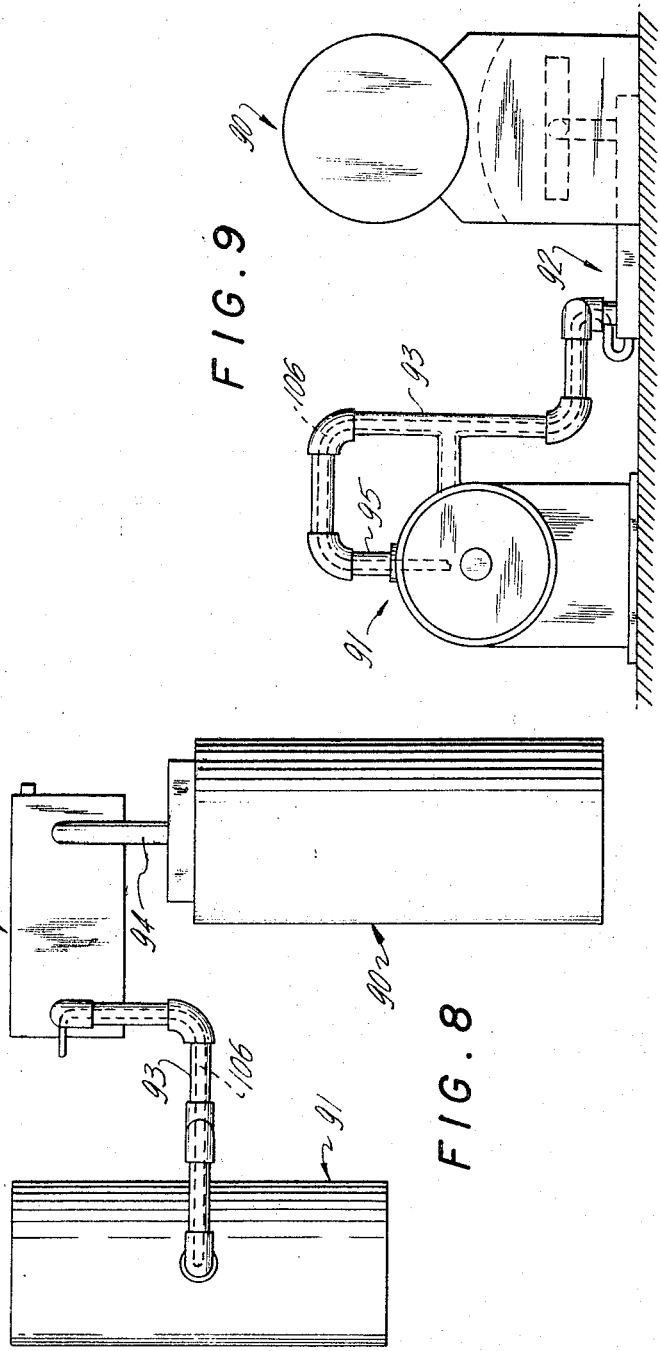

3,452,551
MULTIPLE STAGE DIRECT FIRED ABSORPTION
REFRIGERATION SYSTEM
David Aronson, Upper Montclair, N.J., assignor to
Harrworth, Inc., Harrison, N.J., a corporation of
Delaware
Filed Nov. 28, 1967, Ser. No. 686,030
Int. Cl. F25b 15/06
U.S. Cl. 62—148                                    10 Claims

ABSTRACT OF THE DISCLOSURE

An absorption refrigeration system using a salt solution and having double effect generators connected in parallel, heat exchangers in heat exchange relation with the second stage generator and an arrangement to blow the strong solution from the first stage heat exchanger to the absorber upon shutdown to avoid plugging of lines by crystallization of salt from solution and permit the use of simplified controls.

---

The present invention relates to absorption refrigeration and more particularly to an improved combination and arrangement of elements in an absorption refrigeration system having double effect generators.

In conventional absorption refrigeration systems, absorption solution diluted with liquid refrigerant is supplied to a generator where it is heated to drive off refrigerant vapor. The vapor then passes to a condenser where it is condensed to a liquid by the removal of the heat of vaporization. The more concentrated absorption solution from which refrigerant vapor has been removed is then delivered to an absorber in heat exchange with dilute solution being delivered to the generator. Liquid refrigerant flows from the condenser through an expansion valve, or other pressure balancing means, into an evaporator where it evaporates at a lower pressure and temperature as controlled by the vapor pressure of the refrigerant in the absorbent at the temperature therein.

Liquid refrigerant is brought into heat exchange relation with a medium to be cooled, such as chilled water or air, which transfers its heat to evaporate the refrigerant and approaches the temperature in the evaporator. The absorption solution diluted by the absorption of refrigerant vapor then is returned to the generator to repeat the cycle. With the system described above the heat supplied to expel each pound of refrigerant vapor from solution in the generator must be removed from the vapor in the condenser to condense it back to a liquid.

Also, it has been proposed to provide double effect generators in an absorption refrigeration system by which vapor expelled from one body of solution at one pressure and temperature by the application of heat is used to heat another body of solution at a lower pressure and temperature. Thus, the heat supplied to expel one pound of refrigerant vapor in a conventional system is utilized to expel an additional quantity of refrigerant vapor. An absorption refrigerant system with double effect generators, therefore, has an improved thermal efficiency over conventional systems, but requires additional equipment in the form of a second generator and auxiliary parts. One of the problems involved when such an absorption refrigeration system uses a salt solution as an absorbent, and especially when using double effect generators, is the crystallization of salt out of solution on shutdown which is apt to plug the lines and prevent the flow of solution on start-up. Still another problem with absorption refrigeration systems using double effect generators is to control operation for varying load conditions. Also, absorption refrigeration systems with double effect generators usually have the generators arranged in series, which presents a considerable problem in providing simple controls for partial load conditions.

One of the objects of the present invention is to provide an improved construction and arrangement of elements in an absorption refrigeration system having double effect generators which materially reduces the possibility of plugged lines due to crystallization of salt from solution during shutdown.

Another object is to provide a simple and effective control for an absorption refrigeration system having double effect generators which provides for efficient operation between minimum and maximum load conditions.

Another object is to provide an absorption refrigeration system of the type indicated which permits the use of simplified controls for controlling the capacity of the system, provides good economy in operation at partial loads and avoids increases in the concentration of the absorption solution at any operating condition which may cause crystallization of salt out of solution.

Still another object is to provide an absorption refrigeration system of the type indicated which is of simple and compact construction, economical to manufacture and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a diagrammatic view of an absorption refrigeration system incorporating the novel features of the present invention and showing the double effect generators connected in parallel and the heat exchangers in a heat exchange relation with the auxiliary generator;

FIGURE 2 is a view of the pump illustrated in FIGURE 1 for recirculating absorbent and showing a modified construction for controlling the flow of dilute solution to the main generator;

FIGURE 3 is a perspective view of an absorption refrigeration system showing a structural arrangement of the elements illustrated diagrammatically in FIGURE 1;

FIGURE 4 is a sectional plan view taken on line 4—4 of FIGURE 3 to show the bundle of tubes in the chamber constituting the auxiliary generator;

FIGURE 5 is a sectional view taken on line 5—5 of FIGURE 3 and showing the construction of the heat exchangers for the main and auxiliary generators;

FIGURE 6 is a transverse sectional view taken on line 6—6 of FIGURE 3 to show the connection for delivering liquid refrigerant from the condenser to the evaporator;

FIGURE 7 is a transverse sectional view taken on line 7—7 of FIGURE 3 to show the header at the end of the bundle of tubes constituting the auxiliary generator and the connection for delivering condensate into the condenser;

FIGURE 8 is a plan view of another modified construction and arrangement of elements in an absorption refrigeration system incorporating the present invention;

FIGURE 9 is an elevational view of the refrigeration system illustrated in FIGURE 8;

FIGURE 10 is a sectional plan view of the heat exchanger illustrated in FIGURES 8 and 9; and FIGURE 11 is a longitudinal sectional view taken on line 11—11 of FIGURE 10 to show the separator for separating refrigerant vapor from solution.

While the absorption solution system of the present invention may have other applications, it is particularly adapted for use with systems using a water as a refrigerant and a salt solution as an absorbent. Therefore, the invention will be described as containing a water solution of a salt such as lithium bromide or lithium chloride, or a combination of both. For purposes of description the salt solution rich in refrigerant (water) flowing to the generators will be hereinafter referred to as dilute solution; while salt solution poor in refrigerant (water) flowing to the absorber will be referred to as strong solution.

In general the refrigeration system comprises a generator 1, a condenser 2, an evaporator 3, and absorber 4 interconnected to provide paths of flow for refrigerant from the generator through the condenser to the evaporator and for absorbent between generator and absorber. In the illustrated embodiment the generator 1 is shown in the form of a chamber 5 having a bundle of tubes 6 therein extending between headers 7 and 8. Solution is maintained at a level L–1 in the chamber 5, as later explained, and steam supplied to the interior of the tubes 6 from the header 7 heats the solution surrounding the tubes to expel refrigerant vapor therefrom and condense the steam in the tubes.

Refrigerant vapor expelled from solution in the generator flows to the condenser 2 which is in the form of a rectangular box 11 in the space above the solution in the generator 1 and having an open top through which the vapor may enter. A cooling coil 12 is provided in the condenser 2 through which a cooling medium circulates to provide a cold surface to which the refrigerant vapor transfers its heat of vaporization and condenses to a liquid. Such condensation tends to produce a void adjacent the coil surface into which other vapor flows to maintain a continuous flow of refrigerant vapor to the coil. The temperature of the cooling coil 12 controls the pressure in the generator 1.

Liquid refrigerant condensed in the condenser 2 then flows to the evaporator 3, through a conduit provided with a suitable means to maintain the difference in pressure therebetween. In the illustrated embodiment the pressure difference is maintained by a U-tube 13 which resists flow from the condenser 2 to the evaporator 3.

Evaporator 3 comprises the bottom of a cylindrical tank 14 into which the upper end of the U-tube 13 projects. Preferably, the upper section of U-tube 13 is made of larger diameter than the lower section to accommodate any flashing of liquid refrigerant into vapor as the pressure decreases without excessive flow restriction on a high pressure drop. Such flashing of liquid refrigerant reduces the temperature of liquid refrigerant entering the evaporator to a temperature corresponding to the vapor pressure (one-tenth of a pound per square inch) maintained in the evaporator. Liquid refrigerant is continuously recirculated from the bottom of the evaporator by means of conduit 15, pump 16, and conduit 17 having an end 17a extending into and across the evaporator 3 with spray nozzles 18 through which the refrigerant is delivered back to the evaporator. Underlying the spray nozzles 18 is a coil 19 through which a liquid heat transfer medium, such as water, is chilled and circulated by a pump 20 through an external heat exchanger (not shown) for cooling air or the like. As the liquid refrigerant sprayed through the nozzles 18 contacts the surface of the coil 19, it evaporates at the lower pressure existing in the evaporator and thereby removes heat therefrom.

The absorber 4 is in the form of a vessel 24 mounted in the cylindrical tank above the spray pipe 17a of the evaporator 3 and in open communication with the evaporator between its sides and the sides of the tank. Absorption solution is continuously recirculated from a depending sump 25 from the absorber through a conduit 26 to pump 27 and then from the pump through a return conduit 28 and spray pipe 28a extending into and across the top of the absorber vessel 24. The spray pipe 28a has nozzles 29 from which the absorption solution is sprayed into the absorber vessel 24 and over the surfaces of a cooling coil 30. Cooling water is circulated through cooling coil 30 to maintain the solution at a relatively low temperature approaching the temperature of the cooling water. In the illustrated embodiment shown in FIGURE 1, the cooling water flows from an external source through coil 30 in the absorber 24 and then through a connecting line 31 to the cooling coil 12 in the condenser 2. While not shown, it will be understood that the cooling water leaving the condenser 12 will be delivered to a heat sump where the heat of absorption and heat of condensation will be dissipated, such as a cooling tower, spray pond, or the like, after which the cooling water will be returned to the cooling coil 30 in the absorber to complete its cycle.

Absorption solution also is delivered from the sump 25 through a conduit 34 and one path 35 of a heat exchanger 36 to the bottom of the generator 1 at one side thereof. Strong solution from which refrigerant has been expelled flows from the bottom of the generator 1 through an opening at its opposite side and another path 37 of the heat exchanger 36. The heat exchanger 36 is a shell and tube type in which the interior of the tubes and end headers form the one path 35 and the space between the tubes and shell 37 form the other path 37. Baffles 38 may be provided in the shell 37 to insure a circulation of strong solution around all sections of the tubes. Strong solution then flows from the heat exchanger 36 into a chamber 39 at one side thereof which has a partition 40. Strong solution flows upwardly over the top of partition 40 and downwardly on the other side, then through a conduit 41 to a venturi 42 in a bypass connection 43 between the inlet and outlet of pump 27. Thus, dilute solution is continuously supplied to the generator 1, through the heat exchanger 36 and strong solution is continuously fed into the recirculating absorbent to increase the concentration of salt in the solution delivered to the absorber 4. Any suitable flow control arrangement may be provided such as those described in my prior U.S. Letters Patents 3,262,282 issued July 26, 1966; 3,263,437 issued Aug. 2, 1966; or 3,279,212 issued Oct. 18, 1966. The absorption refrigeration system as thus far described is of a conventional construction.

In accordance with the present invention a direct fired generator 46 is provided and the vapor expelled from this generator at a higher pressure is used as the steam to heat the generator 1, which operates at a lower pressure. The generator 46 will hereinafter be referred to as the main generator and the generator 1 as the auxiliary generator. The main generator 46 is illustrated in the form of a direct-fired horizontal-return tubular boiler having a shell 47, a combustion chamber 48 and finned tubes 49 extending between tube sheets (not shown). The generator 46 is heated by a burner 50 for a fuel, such as natural gas, that is supplied through an inlet pipe 51. A modulating valve 52 in the inlet pipe 51 controls the supply of fuel to the burner 50 and the valve is controlled by a pressure sensing element 53 in the space above the solution to maintain a constant pressure in the boiler of, for example, 12 p.s.i. gage. A vapor take-off pipe 54 is connected to the top of the generator 46 and an overflow outlet 55 is provided at the side of the generator shell 47 at a position above the tubes 49 to limit the height of liquid level L-4 in the generator. As shown, the vapor takeoff pipe 54 is of inverted U-shape and extends upwardly from the boiler, laterally and then downwardly and the overflow outlet 55 is connected to downleg of the takeoff pipe, the lower end of which, in turn, is connected to the space between shell and tubes of a heat exchanger 60.

Dilute solution is supplied to the generator 46 from the adsorber 4 by means of a branch 56 from the recirculating conduit 26 connected to the inlet of a pump 57. Pump 57 delivers the dilute solution through a conduit 58, tubes 59 forming one path of flow through a tube and shell type heat exchanger 60 and a conduit 61 connected to the bottom of the generator 46. Conduit 61 extends upwardly in the downleg of the takeoff conduit 54 to a level above the overflow outlet 55. Conduit 61 has a break at its upper end with a curved end overlying a cup at the upper end of a section 61b. The two sections 61 and 61b of the conduit form an inverted U-tube with leg 61b extending downwardly through conduit 54 and then to the bottom of generator 46. The break between the conduit sections 61 and 61b above the overflow outlet 55 balances the pressure on the solution in the generator 46 to prevent the solution from being blown therefrom during shutdown.

Strong solution leaving the generator 46 through the overflow outlet 55 flows through takeoff conduit 54 in heat exchange with the conduits sections 61 and 61a and into heat exchanger 60. Baffles 62 may be provided in the heat exchanger 60 to insure flow of strong solution in initimate contact with the exterior of all sections of the tubes of the exchanger. The strong solution then flows from heat exchanger 60 through a short conduit 63 into the return conduit 28 of the circuit for recirculating adsorption solution in the absorber.

Refrigerant vapor expelled from the generator 46 flows from the takeoff pipe into a vapor pipe 64 to the header 7 for the bundle of tubes 6 in the generator 1. Steam supplied to the interior of the bundle of tubes 6 condenses therein and flows to the header 8 from whence it is delivered through a riser 65 into the condenser 2. A restrictor, 66, such as a fixed orifice, is shown in the riser 65 to maintain the difference in pressure between the main and the auxiliary generators 46 and 1, but it will be understood that the restrictor may take the form of a small pipe of uniform diameter throughout its length.

Thus, one feature of the present invention resides in the arrangement of elements between absorber 4 and main generator 46 such that all strong solution other than that in the main generator itself will be blown back into the absorber upon shutdown and become mixed with the solution therein to prevent plugging of the lines by crystallization of salt from the solution and deposition in the path of flow. However, during operation the delivery of strong solution from the generator 46 and the flow of recirculated absorbent by pump 27 is controlled by the restriction created by nozzles 29. In addition, a resistor 67 may be provided in the pipe 54 in the form of an orifice to regulate the rate of flow of strong solution from the generator 46 to maintain the liquid at some level L-5 in the downleg of the takeoff pipe 54. Upon shutdown, operation of pump 27 will be discontinued, but the pressure in the generator 46 will continue for some period of time after shutdown to blow the strong solution from the pipe 54 through the heat exchanger 60 and conduits 63 and 28 back into the adsorber 4 where it will mix with the more dilute solution therein.

Another feature of applicant's invention is the simple control arrangement for regulating operation of the system for all load conditions between maximum and minimum. As previously explained, the modulating valve 52 and pressure responsive sensing element 53 maintain a constant pressure in the generator 46 of, for example, 12 pounds per square inch gage; and a modulating valve, such as 73, indirectly controls the flow of weak solution to the auxiliary generator 1 as described in U.S. Letters Patent 3,225,556 in accordance with load conditions. In addition, the conduit 58 from the pump 57 for weak solution flowing to the generator 46 may have a modulating valve 70 therein which is controlled by a temperature responsive element at the bottom of the downleg of the take off pipe 54. Thus, when the temperature of the solution leaving generator 46 falls below a predetermined value in takeoff pipe 54, the modulating valve 70 tends to close to supply less solution to the generator 46, and when the temperature of the solution leaving generator 46 rises, the valve opens to increase the flow rate. By this arrangement a substantially constant pressure is maintained in the generator 46 and solution is supplied at the rate required to maintain substantially the same concentration. A by-pass 75 is provided around valve 70 and having an adjustable valve 76 therein to insure a fixed minimum rate of flow of dilute solution to the generator 46.

In addition, an overflow line 72 from the absorber sump is positioned above the outlet end of conduit 26 and below the outlet end of conduit 34. The overflow line 72 has the modulating valve 73 therein operated by a temperture sensing element 74 responsive to the temperature of chilled water leaving the cooling coil 19 in the evaporator 3. Thus, when the temperature of the chilled water is below a certain level the valve 73 is open to drain solution from the sump 25 through the overflow line 72 to a level below the upper end of the conduit 34 and deliver the drained solution to the overflow chamber 39 from the generator 1. With no solution flow to the generator 1 the concentration of solution therin increases with a decrease in the amount of steam condensed in the tube bundle 6 which, in turn, tends to increase the pressure in generator 46 with a closing of gas valve 52 and a decrease in the amount of heat supplied to maintain the boiler pressure substantially constant. With the rate of flow from generator 46 substantially constant and less vapor being expelled, the concentration of the solution decreases with a corresponding decrease in its temperature. Sensing element 71 feels this decrease in temperature and acting through valve 70 decreases the amount of solution supplied to generator 46 tending to maintain the concentration of the solution therein substantially constant. This operation with reduced flow to generator 46 continues so long as a partial load condition exists. However, when the temperature of the chilled water from the evaporator 3 increases, valve 73 closes, solution builds up in absorber vessel 4 and increases flow through conduit 34 to generator 1 where vapor is expelled from the relatively dilute solution at a faster rate so that more steam flows from generator 46 to the tube 6, all automatically in accordance with variations in the load.

Alternatively, if the flow to generator 46 is maintained constant at the rate required for full load conditions by eliminating valve 70, there will be an excessive rate of flow at part load. In such a modified arrangement a restriction may be provided in the line 58 to establish the required fixed rate of flow for full capacity operation. Such a modified arrangement would give poorer part load economy but would be simpler to operate.

Still another feature of the present invention is an arrangement of the elements to provide parallel paths of flow for solution to and from the generators 1 and 46 including the heat exchangers 36 and 60, respectively, and series flow of refrigerant through the generators. These parallel paths of flow for dilute solution comprise the conduit 34 and heat exchanger 36 leading to the generator 1; and conduit 26, pump 57, heat exchanger 60 and conduit sections 61 and 61a to the generator 1. The strong solution is delivered in separate parallel paths from the generator 1 through heat exchanger 36, conduit 41, pump 27, and conduit 28 back to the absorber 4 and from generator 46 through conduit 54, heat exchanger 60 and conduit 63 to conduit 28. Thus, each generator 1 and 46 and each corresponding exchanger 36 and 60 need only be of a size to pass about a half of the solution used in the system. One absorption refrigeration system incorporating the novel features of the present invention having now been described in detail the mode of operation is next explained.

Assuming for purpose of description that solution and liquid refrigerant stand in the generator 1 at level L–1, evaporator 3 at level L–2, absorber 4 at level L–3, generator 46 at level L–4 and in takeoff pipe 54 at level L–5, respectively, and that the system is operating at full capacity. Dilute absorption solution is being withdrawn from absorber sump 25 through the conduit 26 to the pump 27 and is recirculated back through conduit 28 to the nozzles 29 of the spray pipe 28a. Strong solution from the generators 1 and 46 flows back through the conduit 28 to absorber 4 to increase the concentration of salt in the solution supplied to the absorber. As the relatively strong absorption solution flows over the cooling coil 30, it is cooled and spread over a large surface area and has a high affinity for refrigerant vapor flowing from the evaporator 3 which it absorbs.

Liquid refrigerant is recirculated from the evaporator 3 through the conduit 15 by pump 16 and returned through conduit 17 to the spray pipe 17a having the nozzles 18. The liquid refrigerant is sprayed from nozzles 18 onto the chilled water coil 19 and evaporates part of it at a low temperature as controlled by the vapor pressure of the refrigerant in the absorbent so that heat is transferred to chill the water in the coil and heat the recirculating refrigerant which evaporates.

Heat supplied by the burner 50 heats the solution in the generator 46 and expels refrigerant vapor (water) therefrom which flows into the takeoff pipe 54 and vapor pipe 64 to the header 7 and to the bundle of tubes 6 constituting the auxiliary generator 1. The heat from the steam in the tubes 6 flows through the walls of the tubes to solution in the generator 1 to expel refrigerant vapor therefrom which flows to the condenser 3 where it is condensed to a liquid. Simultaneously, refrigerant is condensed in the tubes 6 of generator 1 and the condensate flows into the header 8 and from the header through the riser 65 into condenser 2 by the difference in pressure between elements. Liquid refrigerant continuously flows from the condenser 2 through U-tube 13 to the evaporator 3, due to the difference in pressure, where it is stored.

Strong solution flows from the generator 46 through the overflow outlet 55 into the takeoff conduit 54, then through heat exchanger 60 and conduit 63 to the return conduit 28 of the recirculating circuit for the absorption solution. Strong solution from the generator 1 flows from the heat exchanger 36, through conduit 41 into pump 27 and from the pump back to the conduit 28 the same as the strong solution from the generator 46 to deliver strong solution to the absorber.

The system continues to operate in this manner so long as a maximum load exists. The flow of dilute solution to the generator 46 is maintained at the rate required by the modulating valve 70 and temperature responsive element 71. The flow of dilute solution to the generator 1 is controlled by the overflow modulating valve 73 and temperature sensitive element 74 responsive to the chilled water being circulated to start and stop the flow in the conduit 34. The pressure in the direct fired generator 46 is maintained constant by the modulating fuel control valve 52.

Upon shutdown of the entire unit, the pumps 16, 27 and 57 stop and the burner 50 for the generator 46 also is shut off. However, the residual heat in the generator 46 will continue to expel vapor for a period of time and the relatively high pressure in the generator will force the strong solution in the takeoff pipe 54, casing of the heat exchanger 60 and conduits 63 and 28 to be blown into the absorber 4 where it will be mixed with the more dilute solution. Thus, after a period of time any solution flowing back into the heat exchanger 60 will be a dilute solution having less tendency to crystallize.

Furthermore, both heat exchangers 36 and 60 are in heat exchange relation with each other and with the generator 1 which further tends to keep the elements warm and prevent crystallization of salt from solution. In each instance, the strong solution flows through the casing passage of heat exchangers 36 and 60 having a larger space to further reduce the possibility of plugging any paths of flow by crystallization.

Upon start up after an idle period the fuel burner 50 directly heats the solution in the generator 46 to immediately dissolve any crystals of salt which may have precipitated. The heat supplied to the generator 46 also drives off refrigerant vapor which flows immediately into header 7 and bundle of tubes 6 connected thereto in the auxiliary generator 1. The hot vapor heats the solution in the auxiliary generator and redissolves any salt crystals that may have precipitated. Furthermore, at least some of the heat supplied to the generator 1 is transferred by conduction to the heat exchangers 36 and 60 to warm up the solution therein. Thus, the construction and arrangements of elements reduces the possibility of plugging by salt crystals to a minimum.

FIGURE 2 illustrates a modified arrangement for controlling the system which eliminates one pump from the system illustrated in FIGURE 1. With this modified arrangement the dilute solution is delivered to the main generator 46 through a branch line 77 leading from conduit 28a to the recirculating pump 27a instead of from a separate pump 57. The branch line 77 has a modulating valve 70a generally similar to the valve 70 and controlled by a thermal responsive element 71a for feeling the temperature of the solution in the takeoff pipe 54. An additional valve 78 is provided in the conduit 28a for the recirculating circuit to regulate the distribution of solution through conduit and branch line 77. The construction illustrated in FIGURE 2 utilizes the pressure from pump 27 to deliver dilute solution to the main generator 46 thereby eliminating the necessity of pump 57 illustrated in FIGURE 1.

FIGURES 3 to 7 illustrate an absorption refrigeration system generally like that illustrated in FIGURE 1, but more nearly approaching a commercial structure that would be used. As will be observed by reference to FIGURE 3 the cylindrical tank 14a overlies and is supported on the auxiliary generator 1a with a condenser 2a therebetween. Underlying the auxiliary generator 1a are the heat exchangers 36a and 60a in direct heat exchange relation with the generator and extending throughout its length. For the purpose of illustration, the heat exchangers 36a and 60a are shown in parallel side by side relation and extending throughout the length of the generator 1a, but it will be understood that the heat exchangers may be arranged in end to end relation to reduce thermal stress.

Although only a single solution inlet 61b and a single outlet 55 are shown for the main generator 46, in actual practice there would be a series of inlets and outlets longitudinally along the generator to insure sufficient mixing of solution in the generator and thereby provide a relatively uniform gradient of solution strength between the inlet and the outlet. This is important since the operating range of concentrations will normally be from 60 to 65 percent lithium bromide by weight and local over concentration can easily increase the boiling temperature of the solution, and consequently the rate of corrosion, to the point where premature tube failure results. Another method of obtaining uniformity is to have the solution enter at one end and leave at the other end of the generator.

The auxiliary generator 1a contains a bundle of tubes 6a which extends longitudinally throughout its length between headers 7a and 8a, see FIGURE 4. FIGURE 4 also illustrates the riser 65a in the header 8a for delivering condensate to the condenser 2a. The cooling coils 12a in the condenser 2a are formed as another bundle of tubes 12a extending between headers (not shown) like the tubes 6a of generator 1a.

Steam from the main generator 46a is delivered through the takeoff pipe 54a and vapor pipe 64a to the header 7a and tubes 6a, see FIGURES 3 and 4. Solution from the generator 46a flows into the end of heat exchanger 60a, as shown in FIGURE 3, and flows throughout the length of the heat exchanger to the rearward end as shown in FIGURE 5. Dilute solution flows from the bottom of the absorber sump 25a through the conduit 26a into the pump 27a for recirculation through the conduit 28a and a portion of solution is delivered to the pump 57a. Dilute solution from pump 57a flows through conduit 58a and one path of the heat exchanger 60a, as shown most clearly in FIGURE 5. The dilute solution flows in a zig-zag path through the partitioned header sections 81 and 82 and transverse tubes 83 connected between alternate header sections at opposite sides in a direction countercircuit to the strong solution following longitudinally between the headers and over the transverse tubes.

Dilute solution also flows from the sump 25a through the conduit 34a to the rearward end of a partitioned header 84 of the heat exchanger 36a. Heat exchanger 36a is of the same construction as of the heat exchanger 60a having partitions dividing the headers 84 and 85 between which tubes 83 extend to provide a tortuous path for the dilute solution as it flows from the rearward to the forward end of the heat exchanger. In the forward end of the header 84 an opening 87 permits dilute solution to enter the generator. As will be observed by reference to FIGURE 4, an opening 89 is provided in the forward end of the heat exchanger 36a through which strong solution from the generator 1a may flow rearwardly between the headers 84 and 85 to the conduit 41a connected to the bypass 43a of the pump 27a. An overflow control conduit 72a descends from the sump tank 25a of the absorber 4a the same as in FIGURE 1, and the overflow conduit has a valve 73a for controlling the flow of dilute solution to the auxiliary generator 1a.

The cross-sectional view of FIGURE 6 illustrates the arrangement of elements and more specifically shows the U-tube 13a for connecting the condenser 2a and evaporator 3a and through which refrigerant flows due to the difference in pressure. FIGURE 7 is similar to FIGURE 6 and shows the riser 65a extending upwardly from the header 8a at the end of the generator 1a to the condenser 2a. The apparatus illustrated in FIGURES 3 to 7 operates in the same way as described with respect to the apparatus shown in FIGURE 1.

FIGURES 8 to 11 illustrate a still further modified absorption refrigeration unit 90 like that illustrated in FIGURE 3 is connected to a main generator 91 to one end of the heat exchanger 92 and a conduit 94 connects the other end of heat exchanger to the unit 90. In this arrangement the conduit 93, see FIGURES 8 and 9, has a takeoff pipe 93 through which solution overflows in contact with refrigerant vapor which may come off through top offtake pipe 95, or directly above the liquid stream in pipe 93. Pipe 95 is shown as a central offtake and pipe 93 as an overflow at one end. The actual location of offtake pipe 95 with respect to the length of the generator 91 is not critical. However, it is preferably if solution enters at one end in order to discharge at the other end and so insure uniform increase in concentration down the length of the exchanger, then inlet pipe 106 and outlet overflow pipe 93 must be at opposite ends. In accordance with the teaching of this invention, it is preferable to have vapor space surrounding the liquid feed line 106, as shown in FIGURE 9. However, since there is vapor surrounding the pipe, it will warm the liquid within line 106 whether or not there is significant flow of vapor. The condensing temperature of the vapor is considerably above the temperature at which the dilute solution in line 106 would crystallize.

Within pipe 93 concentrated liquid is in direct physical contact with superheated vapor. The two fluids are separated at the inlet to heat exchanger 92, as shown in FIGURE 11, where the fluid impinges against inclined separator plate 96. This impingement separates the liquid from the vapor with the solution flowing down the inclined plate into a header 97 at the end of the heat exchanger. Vapor separated from the solution then passes through an eliminator 98 which further baffles vapor from solution. Separated vapor then flows along the chamber 99 to the outlet 100 where it is directed into the heating tubes of the auxiliary generator in the unit 90.

Strong solution, in turn, flows along the central passage 101 of the heat exchanger 92 between headers 102 and 103 to an outlet 104 connected to the conduit 28 of the recirculating system shown in FIGURES 1 and 3. Dilute solution flows into the header 102 of the heat exchanger 92 through an inlet nipple 105. The heat exchanger 60a illustrated in FIGURE 5 and has partitions in the headers 102 and 103 to divide them into alternate sections at opposite sides and between which tubes 106 extend to direct the solution into a tortuous path. The dilute solution delivered from the heat exchanger 92 is directed through a conduit 106 into the conduit 93 and extends concentrically therethrough and back into the top of the main generator 91 and to a depth below the level therein.

The apparatus illustrated in FIGURES 8 to 11 provides a direct path from the high pressure main generator 91 through the heat exchanger 92 to the absorber in the refrigeration unit 90 to blow strong solution from the heat exchanger during shutdown to prevent plugging of lines by crystallization of salt from solution. The system also operates in substantially the same way as the systems illustrated in FIGURES 1 to 7 except that the vapor and solution come out of the main generator in one pipe and are separated in a header at the forward end of the heat exchanger 92.

It will now be observed that the present invention provides an improved construction and arrangement of elements in an absorption refrigeration system to provide double effect generators which materially reduce the possibility of clogging due to the crystallization of salt. It also will be observed that the present invention provides an improved control in an absorption refrigeration system having double effect generators which permits efficient operation between minimum and maximum load conditions. It will further be observed that the present invention provides a parallel arrangement of double effect generators for the flow of absorption solution while the expelled vapor flows in series through the generators. It will still further be observed that the present invention provides a refrigeration system of simple and compact construction which may be economically manufactured and which is reliable in operation.

While several embodiments of the invention are herein illustrated and described it will be understood that further changes may be made in the construction and arrangement of elements without departing from the spirit or scope of the invention. For example, a conduit may be provided between the discharge from pump 57 and the strong solution inlet to the heat exchanger 60, as described and claimed in my prior Patent No. 3,263,437 issued Aug. 2, 1966 and entitled Absorption Refrigeration System Control, to insure continuity of flow during transient conditions. Therefore, without limitation in this respect the invention is defined by the following claims.

What is claimed is:

1. In an absorption refrigeration system of the type having a generator, a condenser, an evaporator and an absorber connected to provide a path of flow for refrigerant from the generator through the condenser to the evaporator, a path of flow for strong solution from the generator to the absorber and a conduit forming a path for flow of dilute solution from the absorber to the generator in heat exchange with the strong solution flowing to the absorber, the combination with said elements of a second generator connected to receive dilute solution from and deliver strong solution to the absorber and arranged in parallel with the first generator, a fuel burner for heating said first generator, conduits connected to pass refrigerant vapor from said first generator in heat exchange with solution in the second generator at a lower pressure to condense refrigerant vapor from the first generator and expel vapor from the second generator, said flow path connecting the first generator to the absorber providing a continuous path from which strong solution will be blown into the absorber by the higher pressure vapor in said generator upon shutdown, a heat exchanger between each generator and the absorber and arranged in heat exchange relation with the second generator, and control means comprising a modulating valve for the fuel burner and operable in response to the pressure in the first generator to maintain a constant pressure therein, and a modulating control valve in the conduit forming a path for flow of dilute solution from the absorber to the first mentioned generator and operable in response to the temperature of the solution leaving the first mentioned generator.

2. An absorption refrigeration system having a first stage generator, a condenser, an evaporator and an absorber connected to provide a path of flow for refrigerant from the first stage generator through the condenser to the evaporator, a path of flow for strong solution from said generator to the absorber and a path of flow for dilute solution from the absorber to said generator in heat exchange with the strong solution flowing from the generator, a second stage generator, conduits connecting said second stage generator in parallel with the first stage generator to receive dilute solution from and deliver strong solution to the absorber, conduit means to pass refrigerant vapor from the first stage generator in heat exchange with solution in the second stage generator to condense refrigerant vapor from the first stage generator and expel vapor from the second stage generator, and said strong solution flow paths connecting the first stage generator to the absorber providing a continuous path from which strong solution will be blown into the absorber by high pressure vapor in the first mentioned generator upon shutdown whereby to avoid plugging of the lines by salt crystallized from solution.

3. An absorption refrigeration system having a first stage generator, a second stage generator, a condenser, an evaporator and an absorber connected to provide a path of flow for refrigerant from the generators through the condenser to the evaporator, parallel paths of flow for dilute solution to said generators and strong solution back to said absorber, a fuel burner for said first stage generator, a modulating valve responsive to the pressure in said first stage generator for controlling the fuel burner to maintain a substantially constant pressure in said generator, conduit means for delivering refrigerant from said first stage generator in heat exchange with the solution in said second stage generator to condense refrigerant vapor from the first stage generator and expel vapor from solution in the second stage generator, a pump for receiving dilute solution from the absorber and delivering it to said first stage generator, and a valve for controlling flow of weak solution to said second stage generator responsive to the temperature of refrigerant in the evaporator.

4. An absorption refrigeration system having a first stage generator, a second stage generator, a condenser, an evaporator, an absorber, a first stage heat exchanger, a second stage heat exchanger, conduits connecting the elements to provide a path of flow for refrigerant from the first stage generator through the second stage generator and condenser to the evaporator, separate paths of flow for strong solution from the first and second stage generators through the heat exchangers to the absorber and separate paths of flow for dilute soltuions from the absorber through the heat exchangers to the generators in heat exchange with the strong solution flowing to the absorber, means in the paths of flow for maintaining a difference in pressure between the generators and between the generators and the evaporator and absorber, said conduits directing refrigerant vapor from the first stage generator in heat exchange with solution in the second stage generator at a lower pressure to condense refrigerant vapor from the first stage generator and expel vapor from the second stage generator, and the conduits connecting the first stage generator to the absorber providing a continuous path through which strong solution will be blown out of the heat exchanger into the absorber by the high pressure vapor in the first stage generator after shutdown.

5. An absorption refrigeration system in accordance with claim 4 in which said heat exchangers between each generator and the absorber are arranged in heat exchange relation with the second stage generator.

6. An absorption refrigeration system in accordance with claim 4 in which the conduit for dilute solution flowing from the heat exchanger to the high pressure generator is located in the conduit for strong solution flowing from the high pressure generator whereby the streams of solution flowing to and from the high pressure generator are in heat exchange relation.

7. An absorption refrigeration system in accordance with claim 4 in which the path of flow for absorption solution flowing to the high pressure generator comprises a pump, and a modulating valve at the outlet side of said pump operably responsive to the temperature of solution leaving the high pressure generator.

8. An absorption refrigeration system in accordance with claim 4 in which the path of flow for refrigerant comprises tubes extending through the solution in the low pressure generator, a header at the outlet ends of said tube for collecting condensate, a conduit from the header to the condenser, and a fixed restrictor in said coduit to maintain the difference in pressure between the generators.

9. An absorption refrigeration system in accordance with claim 5 in which the conduits providing paths of flow for vapor and strong solution from the high pressure boiler comprises an upwardly extending pipe connected at one end to the top of the boiler, at its opposite end to the first heat exchanger and intermediate its ends to the side of the boiler to provide an overflow outlet for solution from the boiler, heat exchange tubes in the low pressure generator, and a pipe connecting the upright pipe above the liquid overflow outlet from the boiler to the heat exchange tubes in the low pressure generator.

10. In an absorption refrigeration system having a high pressure generator, a low pressure generator, a condenser, an evaporator and an absorber interconnected to provide parallel paths of flow for weak solution from the absorber to each of the generators, parallel paths of flow for strong solution from each of the generators to the absorber, a path of flow for refrigerant vapor from the high pressure generator to the heating side of the low pressure generator, a path of flow from the low pressure generator to the condenser and a path of flow for circulating refrigerant between the evaporator and the condenser, wherein the improvement comprises: a control system comprising means afor controlling the flow of dilute solution from the absorber to the low pressure generator in response to the temperature of the fluid being cooled in the evaporator, means for controlling the flow of dilute solution to the high pressure generator in response to the temperature of the strong solution leaving the high pressure generator and means responsive to the pressure in the high pressure generator for controlling heat supplied to the high pressure generator.

References Cited

UNITED STATES PATENTS

| | | | |
|---|---|---|---|
| 2,722,805 | 11/1955 | Leonard | 62—141 |
| 3,248,891 | 5/1966 | Swearingen | 62—148 |
| 3,266,266 | 8/1966 | Reid | 62—476 |
| 3,287,928 | 11/1966 | Reid | 62—148 |
| 3,314,246 | 4/1967 | Hopkins et al. | 62—494 |

LLOYD L. KING, *Primary Examiner.*

U.S. Cl. X.R.

62—476